(12) United States Patent
Hasegawa et al.

(10) Patent No.: US 8,474,963 B2
(45) Date of Patent: Jul. 2, 2013

(54) INKJET RECORDING INK AND IMAGE FORMING METHOD

(75) Inventors: Shin Hasegawa, Shizuoka (JP); Minoru Hakiri, Shizuoka (JP); Mitsuru Naruse, Shizuoka (JP); Hiroyuki Fushimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 338 days.

(21) Appl. No.: 12/992,203

(22) PCT Filed: May 22, 2009

(86) PCT No.: PCT/JP2009/059831
§ 371 (c)(1),
(2), (4) Date: Nov. 11, 2010

(87) PCT Pub. No.: WO2009/145284
PCT Pub. Date: Dec. 3, 2009

(65) Prior Publication Data
US 2011/0074865 A1 Mar. 31, 2011

(30) Foreign Application Priority Data

May 26, 2008 (JP) .................................. 2008-136283

(51) Int. Cl.
*B41J 2/01* (2006.01)
(52) U.S. Cl.
USPC ............. 347/100; 347/95; 523/160; 106/31.6
(58) Field of Classification Search
USPC .................. 347/95, 100, 101, 102, 103, 105, 347/96, 20, 21, 9, 88, 99; 106/31.6, 31.27, 106/31.13; 523/160, 161
See application file for complete search history.

(56) References Cited

U.S. PATENT DOCUMENTS

| | | | |
|---|---|---|---|
| 6,786,959 B2 | 9/2004 | Hakiri et al. | |
| 7,101,919 B2 | 9/2006 | Hasegawa et al. | |
| 7,798,629 B2 | 9/2010 | Hakiri et al. | |
| 7,815,301 B2 | 10/2010 | Hasegawa et al. | |
| 2005/0204957 A1* | 9/2005 | Momose et al. | 106/31.65 |
| 2006/0209149 A1* | 9/2006 | Hasegawa et al. | 347/100 |
| 2006/0272543 A1 | 12/2006 | Hakiri et al. | |
| 2008/0022887 A1* | 1/2008 | Tanoue et al. | 106/31.2 |
| 2008/0036830 A1 | 2/2008 | Natori et al. | |
| 2008/0036840 A1* | 2/2008 | Hakiri et al. | 347/100 |
| 2009/0041940 A1* | 2/2009 | Yokohama et al. | 427/256 |
| 2010/0309260 A1* | 12/2010 | Hakiri et al. | 347/100 |

FOREIGN PATENT DOCUMENTS

| | | |
|---|---|---|
| CN | 1676555 A | 10/2005 |
| JP | 56 147863 | 11/1981 |
| JP | 61 083267 | 4/1986 |
| JP | 03 64376 | 3/1991 |
| JP | 4 18462 | 1/1992 |
| JP | 05 105837 | 4/1993 |
| JP | 08 73785 | 3/1996 |
| JP | 10 88050 | 4/1998 |
| JP | 10 168367 | 6/1998 |
| JP | 2000 212487 | 8/2000 |
| JP | 2001 270217 | 10/2001 |
| JP | 2001 277488 | 10/2001 |
| JP | 2001 277714 | 10/2001 |
| JP | 2002 30243 | 1/2002 |
| JP | 2002 097390 | 4/2002 |
| JP | 2002 167536 | 6/2002 |
| JP | 2003 226827 | 8/2003 |
| JP | 2003 313475 | 11/2003 |
| JP | 2004 010733 | 1/2004 |
| JP | 2004 114692 | 4/2004 |
| JP | 2004 169008 | 6/2004 |
| JP | 2004 285344 | 10/2004 |
| JP | 2005 138383 | 6/2005 |
| JP | 2006-111691 A | 4/2006 |
| JP | 2006 335858 | 12/2006 |
| JP | 2007 084784 | 4/2007 |
| JP | 2007-106997 A | 4/2007 |
| JP | 2007 154021 | 6/2007 |
| JP | 2007-191556 | 8/2007 |
| JP | 2007 211058 | 8/2007 |
| JP | 2007 231191 | 9/2007 |
| JP | 2007 253616 | 10/2007 |
| JP | 2008 63573 | 3/2008 |

OTHER PUBLICATIONS

Office Action issued Sep. 4, 2012 in Japanese Patent Application No. 2008-136283.
International Search Report issued Sep. 8, 2009 in PCT/JP09/059831 filed May 22, 2009.
Combined Office Action and Search Report issued Nov. 5, 2012 in Chinese Application No. 200980119265.0 (With English Translation).

\* cited by examiner

*Primary Examiner* — Manish S Shah
(74) *Attorney, Agent, or Firm* — Oblon, Spivak, McClelland, Maier & Neustadt, L.L.P.

(57) ABSTRACT

An inkjet recording ink which includes: a carbon black; a dispersant, wherein the dispersant is a sodium naphthalenesulfonate-formalin condensate; resin emulsion; and water, in which the resin emulsion contains a resin which is at least one of a urethane resin and a styrene-acryl resin, and the ink satisfies the following relationship: $20 \leq B-A \leq 50$, where A(nm) represents a particle diameter D90 of particles contained in dispersion containing the carbon black, the dispersant, and water, which is before added with the resin emulsion, and B(nm) represents a particle diameter D90 of particles contained in the ink.

9 Claims, No Drawings

INKJET RECORDING INK AND IMAGE FORMING METHOD

TECHNICAL FIELD

The present invention relates an inkjet recording ink, and also relates to an ink cartridge, image forming method, and image recorded matter using the inkjet recording ink.

BACKGROUND ART

The inkjet recording has been known as an advantageous system as it can easily attain full-colored images with a simpler process than that of other recording systems, and also attains images of high resolutions by apparatus of simple configuration.

For inkjet recording, dye inks in which various water-soluble dyes are dissolved in water or a mixed solution of water and an inorganic solvent are used as inkjet recording inks. These dye inks have excellent clear color tone, but has poor light resistance. To compare with the dye inks, pigment inks in which a carbon black or various organic pigments are disposed have excellent light resistance, and thus researches have been actively conducted on such pigment inks.

Since pigments are insoluble to water unlike dyes, it is important to stably disperse the pigment in water in the state of fine particles. However, such dispersion state is not necessary easy to achieve. Especially when the thermal condition for the dispersion system of a pigment is changed, absorption equilibrium of a dispersant and the pigment is disturbed, affecting the interaction between the pigment particles. As a result, the ink may cause the physical change and/or a large amount of the aggregated matter may be generated during the storage of a long period. The physical change, especially a change in its viscosity, and/or generation of aggregated matters can be crucial to an ink for use in an inkjet printer. This is because, the physical change and/or generation of aggregated matters become factors to cause the change in the properties of a head and/or blockage of an ejection nozzle, and thus there is a case where a proper printing cannot be performed. In addition to this, although it is desired to reduce a particle diameter of an ink for the purpose of improving preciseness of images, the pigment ink of a small particle diameter tends to cause aggregation of particles depending on the selection of a system of disperser, dispersing process, and the like, and thus stable ejection cannot be always ensured. As has been mentioned above, there has not been provided any inkjet recording ink which solves all of the above-mentioned problems.

In order to prevent a nozzle blockage or improve a color gamut, it is necessary to reduce an average particle diameter of a pigment for use. However, in any ink containing a polymer dispersant, such as styrene-acryl copolymer or styrene-maleic acid copolymer (see Patent Literature 1), and a sodium naphthalenesulfonate-formalin condensate (see Patent Literature 2) or containing a surfactant, such as polyethylene glycol alkyl phenyl ether (see Patent Literature 3), polyethylene glycol alkyl phenyl ether sulfate (see Patent Literature 4), and polyethylene glycol alkyl phenyl ether phosphate (see Patent Literature 5), an average particle diameter of a pigment is large, and thus these inks have poor ejection stability or liquid stability.

Moreover, it has already been proposed to add resin emulsion to an aqueous pigment ink, mainly for the purpose of improving storage stability. In addition to this proposal, as a proposal for preventing a change in physical property and/or generation of aggregated matters, for example, Patent Literature 6 discloses a method for removing aggregated matters that are generated during the storage for a long period in advance by heating a pigment ink at 50° C. for 100 hours to 500 hours. Moreover, the technology disclosed in Patent Literature 7 realizes this treatment within a short period by heating a pigment, insoluble resin emulsion and saccharide at 65° C. to 80° C. for 0.5 hours to 3 hours. Patent Literature 8 discloses that an ink having a less viscosity change after storage for a long period can be provided by heating a pigment, water and polysaccharide in a solution having pH of 8 or more at 60° C. to 180° C. Patent Literature 9 discloses that an ink having a sharp particle size distribution, excellent glossiness and excellent color reproducibility can be provided by heating a colored fine particle dispersed ink containing a colorant and a resin at 35° C. or more. Patent Literature 10 discloses that an inkjet ink having excellent ejection stability, sufficient fixing ability and sufficient water resistance by defining an average particle diameter and glass transition temperature of a urethane resin. Patent Literature 11 discloses that an image fixing ability, ink storage stability, and ejection stability can be maintained at a desirable degree by selecting a certain polyurethane resin even when a particle diameter of a pigment is in the range of 70 nm to 180 nm. Patent Literature 12 discloses that a sufficient image fixing ability and ink storage ability can be attained by specifying a ratio of a urethane resin and a pigment, formulated amount thereof and a particle diameter of the pigment. Patent Literature 13 discloses that a sufficient image fixing ability can be attained by defining an acid value of a free acid of a urethane resin and a surface tension of an ink. Patent Literature 14 discloses that an image fixing ability, ink storage stability, and ejection stability can be attained with an ink containing resin emulsion in which a resin has urethane bonds by defining a primary particle diameter and DBP oil absorption of a carbon black.

However, the aforementioned polyurethane resin tends to aggregate with influence of an organic solvent contained in an inkjet recording ink, and there are some cases where image fixing ability, ink storage stability and ejection stability are lowered. There have not yet been provided resin emulsion which can attain completely desirable these properties. Especially, a polyurethane resin suitable for pigment inks containing relatively fine pigment having a particle diameter of approximately 100 nm, surfactant-contained dispersing pigment inks and acid carbon black pigment inks has not yet been provided. Moreover, the aforementioned conventional techniques do not mention about attachments of the ink on a head, and conventional surfactant-contained inks have not solved the problem on the attachments of the ink to an inkjet head having an ink-repellent layer containing a silicone resin.

It has been known that the effective method for attaining high quality images on normal paper is to reduce a surface tension of an ink so as to increase wettability of the ink to the normal paper, thereby improving coloring performance. In addition, it is effective to add a resin to the ink so as to improve a resistance of images. For example, Patent Literature 15 proposes an ink containing fine polymer particles, a water insoluble or poor soluble colorant, a water soluble organic solvent and a fluorine-contained surfactant. However, with use of such ink of low surface tension containing the fluorine-contained surfactant, a nozzle plate tends to be easily wet, and thus it is difficult ensure ejection stability.

Moreover, Patent Literature 16 proposes an ink containing a water soluble solvent, a colorant, water, and a polymer containing an alkyleneoxide unit, aromatic ring unit, and carboxyl unit at least in a single molecule, and discloses "liquid-repellent treatment for an area including and surrounding an ejection opening," and "containing a silicone surfactant, fluorine surfactant, or the like" in the specification thereof. However, this literature does not disclose any specific types of the silicone surfactant, and it is difficult to ensure liquid repellency with the low surface tension ink containing a fluorine-contained surfactant with the structure of this proposal.

Moreover, Patent Literature 17 proposes an aqueous dispersion for inkjet recording containing a self-dispersing pigment, polymer particles and a compound having a polysiloxane skeleton, and an aqueous ink containing the aqueous dispersion. However, this ink has a surface tension of 25 mN/m to 50 mN/m, and thus it has not been intended to be as a low-surface-tension ink and no special treatment is not applied to a nozzle plate.

Therefore, Patent Literature 18 proposes to reduce a surface tension of an inkjet ink so as to increase wettablity of the ink to a recording medium, thereby improving an image quality, and also proposes to add a silicone resin to an ink-repellent layer of a nozzle plate placed in an inkjet nozzle. Although an image quality is improved by this proposal of the ink, the performance of the ink-repellent layer formed of a silicone resin is not sufficient to the conventional ink as it is required to have excellent physical resistance durable to wiping or the like, not only ink repellency at the initial stage, to comply to the recent trends, such as a high-speed printer or more frequent use. Accordingly, further improvement or development has been demanded.

Patent Literature 19 proposes an inkjet recording ink containing a carbon black, a dispersant, a urethane resin and water in which the urethane resin has a glass transition temperature of 50° C. to 150° C., and a particle diameter D50 of 5 nm to 20 nm. However, there is no description about the relationship between A (a particle diameter D90 of particles present in dispersion containing the carbon black, the dispersant and water, before added with the resin emulsion) and B (a particle diameter D90 of particles present in the inkjet recording ink), i.e. B−A, in this literature. In addition, the examples disclosed in Patent Literature 19 use color pigments, not a carbon black.

[Patent Literature 1] Japanese Patent Application Laid-Open (JP-A) No. 56-147863
[Patent Literature 2] JP-A No. 61-083267
[Patent Literature 3] JP-A No. 05-105837
[Patent Literature 4] JP-A No. 10-168367
[Patent Literature 5] JP-A No. 10-88050
[Patent Literature 6] JP-A No. 03-64376
[Patent Literature 7] JP-A No. 08-73785
[Patent Literature 8] JP-A No. 2002-30243
[Patent Literature 9] JP-A No. 2003-313475
[Patent Literature 10] JP-A No. 2007-84784
[Patent Literature 11] JP-A No. 2004-169008
[Patent Literature 12] JP-A No. 2004-285344
[Patent Literature 13] JP-A No. 2002-167536
[Patent Literature 14] JP-A No. 2002-97390
[Patent Literature 15] JP-A No. 2003-226827
[Patent Literature 16] JP-A No. 2004-10733
[Patent Literature 17] JP-A No. 2007-154021
[Patent Literature 18] JP-A No. 2005-138383
[Patent Literature 19] JP-A No. 2006-335858

DISCLOSURE OF INVENTION

An object of the present invention is to provide an inkjet recording ink which realizes both shelf-stability and image quality, and prevents to solidify and attach to an inkjet head having an ink-repellent layer formed by PTFE-Ni eutectoid plating, or a treatment with a fluororesin or a silicone resin. Another object of the present invention is to provide an ink cartridge, an image forming method and an image recorded matter, using such the inkjet recording ink.

The means for solving the aforementioned problems are as follows.

<1> An inkjet recording ink containing: a carbon black; a dispersant; resin emulsion; and water, wherein the resin emulsion contains a resin which is at least one of a urethane resin and a styrene-acryl resin, and wherein the ink satisfies the following relationship:

$20 \leq B-A \leq 50$, where A(nm) represents a particle diameter D90 of particles contained in dispersion containing the carbon black, the dispersant, and water, which is before added with the resin emulsion, and B(nm) represents a particle diameter D90 of particles contained in the ink.

<2> The ink according to <1>, wherein an amount of the resin emulsion contained in the ink is 0.1% by mass to 10% by mass on the basis of resin solids, with respect to 100% by mass of the ink.

<3> The ink according to any one of <1> or <2>, wherein the urethane resin is an anionic self-emulsifying etherified polyurethane resin which has an acid value of 50 to 100, and a weight average molecular weight of 10,000 to 30,000.

<4> The ink according to any one of <1> or <2>, wherein the styrene-acryl resin has an acid value of 100 to 200, and a weight average molecular weight of 10,000 to 30,000.

<5> The ink according to any one of <1> to <4>, wherein the dispersant is a sodium naphthalenesulfonate-formalin condensate in which a total amount of a dimer, trimer and tetramer of naphthalenesulfonate is 20% by mass to 80% by mass with respect to the total amount of the condensate, and an amount of the dispersant contained in the ink is defined by a mass ratio with the carbon black, and the mass ratio of the dispersant to the carbon black is 0.01/1 to 2/1.

<6> The ink according to any one of <1> to <5>, wherein the carbon black has a DBP oil adsorption of 300 g/100 g to 750 g/100 g.

<7> The ink according to any one of <1> to <6>, wherein the particles contained in the ink have an average particle diameter D50 of 100 nm to 200 nm.

<8> An ink cartridge, containing a housing, and the inkjet recording ink as defined in any one of <1> to <7> housed in the housing.

<9> An image forming method, containing: printing using the inkjet recording ink as defined in any one of <1> to <7>, by means of an inkjet recording apparatus, wherein the inkjet recording apparatus is equipped with an inkjet head containing an ink-repellent layer formed by PTFE-Ni eutectoid plating, or a treatment with a fluororesin or a silicone resin.

<10> An image recorded matter, containing: an image support (i.e. a recording medium); and a single or pluralities of images or characters printed on the image support by the image forming method as defined in <9>.

According to the present invention, there is provided an inkjet recording ink which realizes both shelf-stability and image quality, and prevents to solidify and attach to an inkjet head having an ink-repellent layer formed by PTFE-Ni eutectoid plating, or a treatment with a fluororesin or a silicone resin, as well as an ink cartridge, an image forming method and an image recorded matter, using such the inkjet recording ink.

BEST MODE FOR CARRYING OUT THE INVENTION

Hereinafter, embodiments of the present invention will be described in detail.

The inkjet recording ink of the present invention contains a carbon black, a dispersant, resin emulsion and water. The resin contained in the resin emulsion is at least one selected from a urethane resin and styrene-acryl resin. By using the specific resin(s), the resin emulsion is formed so as to surround a carbon black particle as a protective colloid, and as a result, shelf stability of the ink, image quality and image resistance are improved compared to the conventional ink.

Moreover, considering attachments of the ink to an inkjet head having an ink-repellent layer formed by PTFE-Ni eutectoid plating, or a treatment with a fluororesin or silicone resin, the ink does not need to be added with a releasing agent unlike conventional inks, as the ink has an improved releasability. Therefore, the problem of wetting due to the additive is solved, and thus it is possible to carry out continuous printing with the ink of the present invention.

In addition, these resins have superior effect for improving friction resistance of a print by forming a film on a paper, compared to other resins. These resins also have effect for preventing coloring components from penetrating into paper, and promoting the fixation to the paper, since the resins have characteristics such that they increases their viscosities and/or aggregate at the time when the ink is arrived at paper such as a recording medium with an impact.

The urethane resin is particularly preferable as it can improve dispersion stability of a carbon black.

In the case where two or more resins are used in combination, an image quality and image resistance can be further improved, while maintaining the shelf stability of the ink, provided that a combination thereof is suitably selected.

The urethane resin for use in the present invention will be more specifically described.

In the present specification and accompanied claims, the urethane resin means a polymer compound mainly composed of a polyurethane skeleton in which a main chain includes a urethane bond as a repeating unit. Among the urethane resin, a water-dispersible urethane resin is particularly preferable.

As such water-dispersible urethane resin, polyurethane aqueous dispersion obtained by introducing a hydrophilic component, which is necessary to make the resin stably dispersed in water, into a main chain of polyurethane skeleton, or dispersing the resin in assistance with external emulsifier is commonly known. Among them, a self-dispersing (self-emulsifying) urethane resin in which a hydrophilic component is introduced into the main chain is preferable. The water-dispersible urethane resin may be of any state, such as colloidal dispersion, emulsion, suspension, and slurry.

Examples of the water-dispersible urethane resin include various water-dispersible urethane resin (e.g. ester urethane resin, ether urethane resin, carbonate urethane resin) formed by reacting a diisocyanate compound, diol compound, and acid-group-contained diol. Examples of the diol compound include polyether diol, polyester diol, and polycarbonate diol. Examples of the acid group contained in the acid-group-contained diol include a carboxylic acid group, and sulfonic acid group. Among them, anionic self-emulsifying ether urethane resin is particularly preferable as the water-dispersible urethane resin.

Specific examples of the diisocyanate compound include: an aliphatic diisocyanate compound such as hexamethylene diisocyanate, and 2,2,4-trimethylhexamethylene diisocyanate; an alicyclic diisocyanate compound such as isophorone diisocyanate, hydrogenated xylene diisocyanate, 1,4-cyclohexane diisocyanate, and 4,4'-dicyclohexylmethane diisocyanate; an aromatic/aliphatic diisocyanate compound such as xylene diisocyanate, and tetramethylxylene diisocyanate; an aromatic diisocyanate compound such as toluylene diisocyanate, and phenylmethane diisocyanate; modified products of these diisocyanate compounds, such as modified product thereof containing carbodiimide, uretodion, or uretoimine.

Specific examples of the diol compound include: polyether diol such as polyethylene glycol, polypropylene glycol, polytetramethylene ether glycol, and polyhexamethylene ether glycol; polyester diol such as polyethylene adipate, polybutylene adipate, polyneopentyl adipate, poly-3-methylpentyl adipate, polyethylene/butylene adipate, and polyneopentyl/hexyl adipate; polylactone diol such as polycaprolactone diol; and polycarbonate diol. Among these, in view of the shelf stability of the ink, the polyether diol compound, polyester diol compound and polycarbonate diol compound are preferably, the polyether diol compound and polycarbonate diol compound are more preferable, and the polyether diol compound is yet more preferable. Since the polyether diol compound and polycarbonate diol compound are unlikely to change their properties by hydrolysis in water, leading desirable storage stability.

Specific examples of the acid-group-contained diol include dimethylol acetate, dimethylol butanoate, dimethylol propionate, and dimethylol butyrate. Among them, dimethylol butanoate is particularly preferable.

The synthesis method of the urethane resin is selected from any known methods in the art without any limitation. Examples of such synthesis method include: a solution method in which a prepolymer containing isocyanate terminals is synthesized in a solvent of a low boiling point that does not react with an isocyanate group, an hydrophilic group(s) is (are) introduced into the prepolymer using diamine, polyol or the like, it is then diluted with water so as to cause a phase transition, the solvent is removed therefore so as to obtain polyurethane dispersion; a prepolymer method in which isocyanate-terminated prepolymer to which a hydrophilic group(s) is (are) introduced is synthesized, the prepolymer is dispersed in water, and reacted with amine so as to elongate the chain, a hot-melt method, a method in which a urethane prepolymer is reacted in an emulsifier-contained aqueous solution using water that is a solvent in the aqueous solution as a chain elongation agent; a method including sulfonating an aromatic ring contained in a urethane prepolymer containing a free isocyanate group, which is obtained from a hydrophobic polyol and aromatic polyisocyanate; and a method using a block-isocyanate.

When the urethane resin is synthesized in accordance with the prepolymer method, a polyhydroxy compound of low molecular weight may be used. Examples of the low-molecular weight polyhydroxy compound include those listed above as materials for the polyester diol, such as glycol and alkylene oxide low molar adducts thereof, trivalent alcohol such as glycerin, trimethylol ethane, and trimethylol propane, and alkylene oxide low molar adducts thereof.

The generally known method for synthesizing the water-dispersible urethane resin is such that a urethane prepolymer formed in an organic solvent phase is phrase transitioned so as to emulsify, and is then chain-elongated in an aqueous phase. As a chain elongation agent for this, polyamines such as diamine are generally known. Specifically, after neutralizing acid groups of the urethane prepolymer derived from dimethylol alkanoic acid, or while neutralizing the acid group of the urethane prepolymer, the urethane prepolymer is water-extended or di- or triamine-extended. The polyamine for use in the amine extension as a chain elongation agent is generally diamine or triamine. Specific examples thereof include hexamethylene diamine, isophorone diamine, hydrazine, and piperazine.

However, it has been found that use of the urethane resin formed by using polyamine as the chain elongation agent tends to adversely affect to storage stability of a recording liquid. This is probably because the urethane resin obtained by amine extension (i.e. the urethane resin containing a polyurethane urea portion) is likely to cause hydrolysis, and polyamines yielded as a byproduct of the hydrolysis functions as an aggregating agent in a carbon black-dispersed recording liquid, as a result such urethane resin has dual adverse effects to the resulting recording liquid.

The urethane resin can be used in the form of an alkali metal salt such as Li, Na and K, or organic amine salt such as ammonia, dimethyl amine, and (mono-, di-, tri-)ethanol amine. These can be obtained by further neutralizing the urethane resin formed by the aforementioned method.

The base used at the time of neutralization is suitably selected depending on a counter ion of the intended salt. Examples thereof include: alkyl amine such as butyl amine and triethyl amine; alkanol amine such as monoethanol amine, diethanol amine, and triethanol amine; and inorganic base such as morpholine, ammonia, and sodium hydroxide.

The styrene-acryl resin for use in the present invention will be explained in detail hereinafter.

The styrene-acryl resin can be prepared in an aqueous medium in accordance with a free-radical emulsifying polymerization method known in the art, by using one kind of a monomer so as to form a homopolymer or using two or more kinds of monomers so as to form a copolymer. A polymer containing a monomer capable of forming a water-insoluble homopolymer is preferable as well as a copolymer of such monomer. Moreover, the polymer can include a monomer capable of forming a water-insoluble homopolymer, provided that the polymer composition is sufficiently water-insoluble on the whole enough to form latex. These polymers can be prepared by emulsion polymerization, solution polymerization, suspension polymerization, dispersion polymerization, ionic polymerization (e.g. cationic and anionic), atomic transfer radical polymerization and other polymerization methods known in the technical field of polymerization.

Preferable examples of the polymer include a styrene-acryl resin prepared by a free radical polymerization of a vinyl monomer in aqueous emulsion. The polymer latex is preferable a homopolymer, copolymer or cross-linked polymer each containing a hydrophobic unsaturated ethylene monomer(s) capable of forming a water-insoluble homopolymer. Also, a copolymer of monomers containing a hydrophilic unsaturated ethylene monomer(s) is preferable, provided that the polymer composition is sufficiently water-insoluble on the whole enough to form a latex.

These styrene-acryl resins can be prepared by emulsion polymerization, dispersion polymerization, suspension polymerization, pulverization or solution/bulk polymerization. The details of the methods and stabilizer for use can be found in "Emulsion Polymerization and Emulsion Polymer," P. A. Lovell, and M. S. El-Aasser, John Wiley & Sons Ltd., England, 1977), and are incorporated herein by the reference.

Examples of the commercially available resin emulsion include: J-450, J-734, J-7600, J-352, J-390, J-7100, J-741, J-74J, J-511, J-840, J-775, HRC-1645, HPD-71, PDX-6102B, and JDX-5050 (styrene-acryl resin emulsion, manufactured by BASF JAPAN LTD.); UC-3900 (styrene-acryl resin emulsion, manufactured by Toagosei Co., Ltd.); SF460, SF460S, SF420, SF110, SF300, and SF361 (polyurethane resin emulsion, manufactured by Nippon Unicar Company Limited); and W-6020, W-5025, W-5661, and W-6010 (polyurethane resin emulsion, manufactured by Mitsui Chemicals, Inc.).

The inkjet recording ink of the present invention satisfies the relationship of $20 < B-A \leq 50$, and preferably satisfies the relationship of $20 \leq B-A \leq 30$, where A (nm) is a particle diameter D90 of particles contained in dispersion containing a carbon black, dispersant and water before added with the resin emulsion, and B (nm) is a particle diameter D90 of particles contained in the inkjet recording ink.

As a common sense, it is considered that the addition of resin emulsion to the dispersion of a carbon black prevents the aggregation between the carbon black particles, and thus the particle diameter D90 thereof does not become large. Having said that, the reason why the relationship represented by the formula above is satisfied is because the resin emulsion is attached around the carbon black particle as a protective colloid, and the particle diameter thereof is temporarily enlarged.

The average particle diameter D50 of the resin emulsion is preferably 5 nm to 20 nm. When the average particle diameter D50 of the resin emulsion is very small in such a scale, the resin emulsion is easily attached to the surroundings of the carbon black, and the vale of B–A is equivalent to a thickness of a protective layer (i.e. a simulated capsule layer) of the resin emulsion.

In addition, the average particle diameter D50 of the resin emulsion is more preferably 5 nm to 10 nm. When the value of B–A is more than 50 nm, the dispersion stability or ejection performance of the ink may be lowered. When the value of B–A is less than 20 nm, the resin emulsion does not sufficiently attach to the carbon black, and thus dispersion stability of the ink may be lowered depending on the formulation of the ink such that the amount of diol solvent or a solvent is large.

The inkjet recording ink of the present invention satisfies the relationship of $0\ nm \leq C-B \leq 15$ nm, where B (nm) is the particle diameter as mentioned above, and C is a particle diameter D90 of particles contained in the ink after being stored at 70° C. for 24 hours. The value of C–B being more than 15 nm when the ink is stored at a high temperature means that the dispersion becomes unstable during storage for a period of time.

The dried film of the resin emulsion has a glass transition temperature Tg of preferably 50° C. to 150° C., more preferably 75° C. to 125° C. When the resin emulsion is added to an ink, resin particles come to in contact with each other at the time when the ink is dried on and/or inside the paper, and fibers of the paper are bonded to each other at the time when forming a film. The image part formed in this manner is not easily swollen though the fibers of the paper tend to swell in contact with water. Moreover, as the fibers of the paper are bonded to each other, a space between the fibers does not expand. Therefore, out flow or bleeding of the image does not occur easily. When the glass transition temperature of the dried film of the resin emulsion is in the range of 50° C. to 150° C., the bonding between the fibers of the paper becomes strong. Moreover, as it has a relatively high grass transition temperature, i.e. 50° C. to 150° C., the dried film is relatively hard, and thus it does not peel even when sticks to a head. Accordingly, such the dried film is suitable for the present invention. When the glass transition temperature thereof is less than 50° C., the resin particles are easily deformed. When the glass transition temperature is more than 150° C., the resin emulsion cannot form a film easily.

Note that, in the present invention, the glass transition temperature of the dried film of the resin emulsion can be determined by a differential scanning chromatography (DSC), or thermomechanical analysis (TMA).

The average particle diameter D50 of particles contained in the inkjet recording ink is preferably 100 nm to 200 nm, more preferably 100 nm to 150 nm. When the average particle diameter D50 is less than 100 nm, carbon black may penetrate into an inner portion of normal paper, and as a result prints of high optical density may not be obtained. When the average particle diameter D50 is more than 200 nm, the ejection performance may be lowered.

The particle diameters D50, D90 used in the present invention can be measured by any conventional method. For example, they can be measured by using a particle size analyzer UPA150, manufactured by Nikkiso Co., Ltd.

Moreover, the particle diameters D50, D90 can be controlled by adjusting peripheral speed of a rotational portion of a disperser, duration for dispersing, flow rate of dispersion, and a temperature of dispersion at the time when a carbon black is dispersed by means of a disperser.

A media mill for use in the present invention can be suitably selected depending on the intended purpose without any restriction. Examples thereof include TORUSMILL manufactured by VMA-GETZMANN GMBH, Starmill manufactured by Ashizawa Finetech Ltd., Biscomill manufactured by AIMEX Co. Ltd., DYNO-MILL manufactured by Shinmaru Enterprises Corporation, DIAMOND FINE MILL manufactured by Mitsubishi Heavy Industries, Ltd., Apex Mega manufactured by Kotobushi Engineering & Manufacturing Co., Ltd., PICO GRAIN MILL manufactured by Asada Iron Works Co., Ltd., OB BEADS MILL manufactured by Eurotec Ltd., and SC MILL manufactured by Mitsui Mining Company Limited.

A media-less mill for use in the present invention is suitably selected depending on the intended purpose without any restriction, and examples thereof include T.K. FILMICS manufactured by PRIMIX Corporation, Altemizer manufactured by Sugino Machine Limited, CLEAR SS5 and CLEARMIX W-MOTION both manufactured by M Technique Co., Ltd., CAVITRON manufactured by Eurotec Ltd., IKA DR2000 manufactured by Shinmaru Enterprises Corporation.

In the present invention, dispersion may be performed by the aforementioned media-less mill before dispersion by the media mill. This is preferable, as dispersibility of coarse particles of 1 μm or more is especially improved, and a standard deviation in a particle size distribution of carbon black particles at the time of later dispersion by a beads mill becomes small.

Moreover, use of the aforementioned media-less mill after dispersion by the media mill contributes to reduce the surface roughness of the carbon black, and to improve dispersion stability.

The amount of the resin emulsion contained in the inkjet recording ink of the present invention is preferably 0.1% by mass to 10% by mass, more preferably 0.2% by mass to 5% by mass on resin solid basis. When the amount is less than 0.1% by mass, the resin covers carbon black when the ink is landed on a recording medium with impact, the amount of the resin forming a protective colloid becomes insufficient, and thus abrasion resistance may become lower. When the amount thereof is more than 10% by mass, the viscosity of the ink is too high to smoothly perform printing in the inkjet system.

The acid value of free acid contained in the urethane resin for use in the present invention is preferably 50 to 100, more preferably 55 to 95 in view of further enhanced storage stability and ejection stability of recording liquid.

When the acid value is less than 50, water solubility may not be exhibited. When the acid value is more than 100, problems occur such that abrasion resistance and water resistance of the coated film may be lowered, viscosity of the ink becomes excessively high, and ejection performance is lowered.

The weight average molecular weight of the urethane resin is preferably 10,000 to 30,000 in view of ejection stability. When the weight average molecular weight is more than 30,000, the viscosity is increased and as a result, ink may not be ejected easily. When the weight average molecular weight is less than 10,000, water solubility of the urethane resin becomes high, effect for imparting gloss is reduced, and liquid stability is also lowered.

Similarly, the acid value of free acid contained in the styrene-acryl resin is preferably 100 to 200, more preferably 125 to 175. The weight average molecular weight of the styrene-acryl resin is preferably 10,000 to 30,000. The reasons for the preferences of the ranges are the same as in the case of the urethane resin.

The dispersant for use in the present invention is preferably a condensation product of sodium naphthalenesulfonate and formaldehyde, i.e. sodium naphthalenesulfonate-formalin condensate. The dispersant is not particularly limited as long as it is equivalent to the condensation product, but those having a total amount of dimer, trimer, tetramer of naphthalene sulfonate of 20% by mass to 80% by mass with respect to the total amount of the condensation product are preferable.

When the total amount thereof is less than 20% by mass, dispersibility is lowered, storage stability of carbon black dispersion and the ink is lowered, and as a result, clog of the nozzle is likely occurred. When the total amount thereof is more than 80% by mass, the viscosity is increased, and dispersing may not be easily achieved.

The mixing ratio of the carbon black to the dispersant, i.e. the carbon black/the dispersant, is preferably 1/0.01 to 1/2, more preferably 1/0.05 to 1/0.5 on mass basis. When the ratio of the dispersant is less than 0.01, the function of the dispersant is hard to be exhibited, storage stability of aqueous carbon black dispersion and ink is lowered, and as a result, clog of the nozzle may be likely occurred. When the ratio of the dispersant is more than 2, the viscosity of the aqueous carbon black dispersion and ink is too high to smoothly perform printing in the inkjet system.

The carbon black for use in the present invention preferably has DBP oil absorption of 300 g/100 g to 750 g/100 g, more preferably 350 g/100 g to 700 g/100 g.

Since the carbon black of high structure can attain high optical density (OD), it is preferred that the carbon black have DBP oil absorption of the aforementioned range.

The inkjet recording ink of the present invention preferably contains a wetting agent as one of the components, and the wetting agent preferably has a boiling point of 180° C. or more. When the wetting agent is contained in an aqueous carbon black ink, water retention and wettability of the ink composition can be maintained. As a result, even after storing the aqueous carbon black ink for long period of time, aggregation of a colorant or increase in the viscosity of ink is not seen, and excellent storage stability can be achieved. Moreover, such an inkjet recording ink that can maintain the fluidity of the dried product thereof when the ink is left open at a tip of a nozzle of an inkjet printer can be provided. Furthermore, during printing or at the time of restating after interruption of printing, the nozzle is not clogged, and high ejection stability can be attained.

Specific examples of the wetting agent include: polyhydric alcohols such as ethylene glycol, diethylene glycol, 1,3-butyl glycol, 3-methyl-1,3-butyl glycol, triethylene glycol, polyethylene glycol, polypropylene glycol, 1,5-pentan diol, 1,6- hexane diol, glycerin, 1,2,6-hexane triol, 2-ethyl-1,3-hexane diol, 1,2,4-butane triol, 1,2,3-butane triol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether, and ethylene glycol monobenzyl ether; nitrogen-contained heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amines such as amides such as formamide, N-methyl formamide, and N,N-dimethyl formamide; amines such as monoethanol amine, diethanol amine, triethanol amine, monoethyl amine, diethyl amine, and triethyl amine; sulfur-contained compounds such as dimethyl sulfoxide, sulfolane, and thiodiethanol; propylene carbonate, and ethylene carbonate.

These wetting agents may be used independently, or in combination.

Among these wetting agents, those containing 1,3-butyl glycol, 3-methyl-1,3-butyl glycol, diethylene glycol, triethylene glycol and/or glycerin are preferable. By using such wetting agents, excellent effects can be attained in terms of the prevention of clog due to the dried ink, i.e. jet failure due to evaporation of water, and improvement of chroma of resulting images.

The inkjet recording ink of the present invention may contain a penetrating agent as one of the components. Examples thereof include polyoxyethylene alkyl ether, polyoxyethylene alkylphenyl ether, polyoxyethylene glycol ester, polyoxyethylene/polyoxypropylene decyl ether, or nonionic surfactants such as acetylene surfactant, silicone surfactant, and fluorosurfactant.

Among these, especially when the fluorosurfactant is added to the ink, wettability of the ink to paper is improved without disturbing the stability of carbon black particles, and images of high coloring quality and less bleeding can be attained.

Specific examples of the fluorosurfactant include perfluoroalkyl sulfonate, perfluoroalkyl carbonate, perfluoroalkyl phosphate, perfluoroalkyl ethylene oxide adduct, perfluoroalkyl betaine, and a perfluoroalkyl amine oxide compound. Among these, the compounds represented by following formulae are preferable in view of the reliability of the compounds.

$$CF_3CF_2(CF_2CF_2)_m—CH_2CH_2O(CH_2CH_2O)_nH$$

In the formula presented above, m represents an integer of 0 to 10, and n represents an integer of 0 to 40.

Examples of the commercially available products include: S-144, and S-145, both manufactured by Asahi Glass Co., Ltd.; FC-170C, FC-430, and Fluorad-FC4430, all manufactured by Sumitomo 3M Limited; FSO, FSO-100, FSN, FSN-100, and FS-300, all manufactured by Du Pont Kabushiki Kaisha; and FT-250, and FT-251, both manufactured by Neos Company Limited. Among these, FSO, FSO-100, FSN, FSN-100, and FS-300 of Du Pont Kabushiki Kaisha are preferable as they can provide desirable a printing quality and shelf stability.

These fluorosurfactants may be used independently, or in combination.

The amount of the fluorosurfactant contained in the inkjet recording ink is preferably 0.1% by mass to 10% by mass, more preferably 0.1% by mass to 5% by mass. When the amount of the fluorosurfactant is less than 0.1% by mass, the penetration of the ink is not significantly improved. When the amount thereof is more than 10% by mass, the viscosity increases and aggregation occurs when the ink is stored at a high temperature, and thus the reliability of the ink is lowered.

Moreover, examples of the commercially available products of the nonionic surfactant other than the fluorosurfactant include BT series manufactured by Nikko Chemicals Co., Ltd., Nonipol series manufactured by Sanyo Chemical Industries, Ltd., D-series and P-series both manufactured by Takemoto Oil & Fat Co., Ltd., Surfinol series manufactured by Air Products Japan, Inc., OLFINE series manufactured by Nisshin Chemical Industry Co., Ltd., and EMALEX DAPE series manufactured by Nihon-Emulsion Co., Ltd.

Other substances contained in the inkjet recording ink of the present invention can be suitably selected depending on the necessity without any restriction. Examples thereof include a defoaming agent, preservative and fungicide, pH adjusting agent, antirust agent, ultraviolet absorber, oxygen absorber, and photostabilizer.

The defoaming agent is suitably selected depending on the intended purpose without any restriction. Preferable examples thereof include a silicone defoaming agent, polyether defoaming agent, and fatty acid ester defoaming agent. These may be used independently, or in combination. Among them, the silicone defoaming agent is preferable as it excels in the defoaming effect.

Examples of the preservative and fungicide include 1,2-benzisothiazoline-3-on, sodium dehydroacetate, sodium sorbate, sodium-2-pyridinethiol-1-oxide, sodium benzoate, and sodium pentachlorophenolate.

As the pH adjusting agent, any arbitrary selected compound can be used depending on the intended purpose pro-

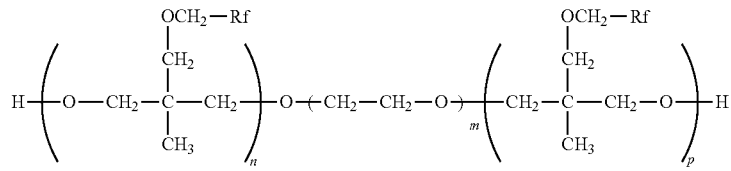

In the formula presented above, Rf represents a fluorine-containing group, e.g. $CF_3$, and $CF_2CF_3$, m represents an integer of 6 to 25, n represents an integer of 1 to 4, and p represents an integer of 1 to 4.

The fluorosurfactant may be arbitrarily synthesized for use, or selected from commercially available products.

vided that it does not adversely affect the ink to be formulated and can control the pH value of the ink to be 7 or more. Examples thereof include: amines such as diethanol amine, and triethanol amine; alkali-metal hydroxides such as lithium hydroxide, sodium hydroxide, and potassium hydroxide; ammonium hydroxide; quaternary ammonium hydroxide;

quaternary phosphonium hydroxide; and alkali-metal carbonates such as lithium carbonate, sodium carbonate and potassium carbonate.

Examples of the antirust agent include acid sulfite, sodium thiosulfate, ammonium thioglycolate, diisopropyl ammonium nitrite, pentaerythritol tetranitrate, and dicyclohexyl ammonium nitrite.

Examples of the antioxidant include phenol antioxidants including hindered phenol antioxidants, amine antioxidants, sulfur antioxidants, and phosphorous antioxidants.

The physical properties of the inkjet recording ink of the present invention are suitably selected and adjusted depending on the intended purpose without any restriction. For example, the viscosity, surface tension and pH are preferable in the ranges stated below.

The viscosity is preferably 5 mPa·s to 20 mPa·s, more preferably 6 mPa·s to 15 mPa·s at 25° C. When the viscosity is more than 20 mPa·s, it may be difficult to ensure the ejection stability of the ink.

The surface tension is preferably 20 mN/m to 40 mN/m at 25° C. When the surface tension is less than 20 mN/m, there are cases where bleeding is significantly appeared on a recording medium, and stable jetting cannot be attained. When the surface tension is more than 40 mN/m, the penetration of the ink to a recording medium becomes insufficient, and thus the time required for drying the ink may be prolonged.

The pH value is preferably 7 to 10.

After the formation of the ink, the inkjet recording ink of the present is preferably subjected to vacuum or pressure filtration with a metal filter or membrane filter, or centrifugal filtration so as to remove coarse particles and foreign matters (e.g. dusts).

An ink cartridge housing the inkjet recording ink of the present invention may be prepared. Such ink cartridge can be placed in an inkjet device, and the inkjet device can provide image formed matter by ejecting the ink corresponding to a recording signal, and forming an image on a recording medium.

As the means for printing using the inkjet recording ink of the present invention, a printing system in which an inkjet system printer, i.e. an inkjet printer, having a continuous jetting recording head or an on-demand recording head is exemplified. Examples of the on-demand system include a piezo system, thermal inkjet system and electrostatic system.

A nozzle plate is formed from a metal material. For example, it is formed of a Ni-plating film by an electroplating. The nozzle plate has a plurality of nozzles that are fine ejecting openings for jetting ink droplets. The interior configuration, i.e. inner shape, of the nozzle may be in the shape of horn (including a substantially cylinder or truncated cone). Moreover, the aperture of the nozzle is about 20 µm to 35 µm based on the diameter at the ink droplet outlet side. The pitch of each nozzle array is 150 dpi. Furthermore, an ink-repellent layer is disposed on the ink ejecting side (nozzle surface side) of the nozzle plate. The water-repellent treatment is preferably at least one of PTFE-Ni eutectoid plating, fluororesin treatment and silicone resin treatment. Among them, the most preferably is that the ink-repellent layer containing a silicone resin is disposed on a surface of the nozzle plate.

The silicone resin is a resin having a siloxane bond consisting of Si and O as a basic skeleton, and is commercially available in various forms such as oil and elastomer. Other than ink repellency that is important in the present invention, the silicone resin has various characteristics such as heat resistance, releasing property, defoaming property, and adhesiveness. The silicone resin has various types such as cold setting, heat setting, and ultraviolet setting, and the type thereof can be selected depending on a preparing method or intended use.

The method for forming the ink-repellent layer containing the silicone resin on the nozzle surface is, for example, a method in which a silicone resin material in the form of liquid is vacuum-deposited, a method in which the ink-repellent layer is formed by plasma-polymerizing silicone oil, a method in which the ink-repellent layer is formed by coating such as spin coating, dip coating and spray coating, an electrodeposition method, or the like.

When the ink-repellent layer is formed by a method other than the electrodeposition method, the ink-repellent layer is formed while nozzle openings and a back surface of a nozzle plate are masked with a photoresist or water-soluble resin, and then the resist is peeled and removed so that the ink-repellent layer containing the silicone resin is only formed on the surface of the nozzle plate. In this case, the selection of a peeling liquid (a developer) for use needs to be carefully considered as the releasing liquid of strong alkali may damage the ink-repellent layer.

The thickness of the ink-repellent layer containing the silicone resin is preferably 0.1 µm to 5.0 µm, more preferably 0.1 µm to 1.0 µm. When the thickness thereof is less than 0.1 µm, resistance to wiping may be lowered, and ink repellency may be lowered after a long period of use. When the thickness thereof is more than 5.0 µm, the ink-repellent layer has a thickness of more than necessary, and thus the production cost may be increased.

The surface roughness Ra of the ink-repellent layer is preferably 0.2 µm or less. By having the surface roughness of 0.2 µm or less, the remaining ink from wiping can be reduced.

When a heat setting liquid silicone resin or elastomer is used as the silicone water-repellent material, such resin or elastomer is applied on a surface of a base, and then subjected to a heat treatment for curing so as to form an ink-repellent film.

When an ultraviolet setting liquid silicone resin or elastomer is used as the silicone water-repellent material, such resin or elastomer is applied on a surface of a base, and then exposed to an ultraviolet ray for curing so as to form an ink-repellent film.

The viscosity of the silicone water-repellent material is preferably 1,000 cp (centipoise) or less.

The critical surface tension of the ink-repellent layer is preferably 5 mN/m to 40 mN/m, more preferably 5 mN/m to 30 mN/m. When the critical surface tension thereof is more than 30 mN/m, there are cases where nozzle plate is excessively wetted with the ink during a long period of use, and the direction for the ejection of the ink may be curved without intension or failures in atomizing of the ink may be cause as printing is repeated. When the critical surface tension thereof is more than 40 mN/m, there are cases where nozzle plate is excessively wetted with the ink from the initial stage of printing, and the direction for the ejection of the ink may be curved without intension or failures in atomizing of the ink may be cause as printing is repeated.

The critical surface tension can be determined by a method proposed by Zisman. Namely, it can be measured in the following manner. At first, a liquid the surface tension of which is already known is dropped on the ink-repellent layer, and then a contact angle θ thereof is measured. The surface tension of the liquid is plotted on an x-axis, and cos θ is plotted on a y-axis so that a line in which the left side is higher than the right side is obtained (Zisman Plot). The surface tension at which this line becomes Y=1 (θ=0) is determined as a critical surface tension γc. The critical surface tension can also be determined by other methods such as a method of Fowkes, method of Owens and Wendt, and method of Van Oss.

The preparation method of the ink cartridge, formation method of the inkjet device and image forming method can be arbitrary selected from techniques known in the art, such as the technique disclosed in JP-A No. 2000-198958.

Moreover, a recording medium for use with the inkjet recording ink of the present invention in the inkjet recording system can be paper which shows absorption to the ink composition, or a medium which shows substantially no absorption to the ink composition.

Specific examples thereof include: plastic sheets in which a base is formed of polyethylene terephthalate, polycarbonate, polypropylene, polyethylene, polysulfone, ABS resin, or polyvinyl chloride; recording mediums having a metal surface such as brass, iron, aluminum, SUS, and cupper, or recording mediums in which none metallic base is metal-coated by a method such as a deposition; recording mediums in which paper is used as a base and is treated to have water repellency; and recording mediums formed by calcininating an inorganic material at a high temperature, i.e. formed of a ceramic material. Among them, paper is particularly preferable in view of the cost efficiency and obtainable natural image.

EXAMPLES

Hereinafter, the present invention will be specifically described based upon examples and comparative Examples, but the present invention shall not be construed by these examples. In the examples and comparative examples below, "part(s)" represents "part(s) by mass" and "%" represents "% by mass", unless otherwise stated. (Examples 1 to 28, and Comparative Examples 1 to 2)

The information of the formulation, and the type and amount of urethane resin or styrene-acryl resin of inks used in Examples and Comparative Examples are presented in Table 1 below. Note that, ink Nos. 1-27 are corresponded to the inks used in Examples 1 to 27, respectively, and ink Nos. 1'-2' are corresponded to the inks used in Comparative Examples 1 to 2. In addition, ink No. 3 was used in Example 28, which was the same ink used in Example 3. The particle diameter D90 (B) of particles contained in each ink was approximately the same as the average particle diameter D50 of the particles in the ink plus 100 nm. Moreover, the dispersant ratio was determined by a value which was obtained by dividing the mass of the dispersant by the mass of the carbon black, i.e. dispersion ratio =dispersant mass/carbon black mass.

At first, carbon black dispersion was prepared in the following manner.

<Basic Preparation Method of Carbon Black Dispersion>

The mixture of the followings was premixed so as to obtain mixed slurry. The slurry was circulated and dispersed by means of a disk media mill (UAM, manufactured by Kotobuki Industries Co., Ltd.) in which zirconia beads of 0.015 mm were used at the filling rate of 70%, at the peripheral speed of 6 m/s, and liquid temperature of 10° C. for 10 minutes, and then subjected to centrifugal separation by means of a centrifugal separator (Model-7700, manufactured by KUBOTA Corporation) so as to separate coarse particles to thereby obtain carbon black dispersion.

| | |
|---|---|
| Carbon black | 175 parts |
| Sodium naphthalenesulfonate-formalin condensate or water-soluble styrene-acryl resin (dispersant) | According to the dispersant ratio of each Example or Comparative Example |
| Distilled water | Balance |

Note that, the acid value of the polyurethane resin or styrene-acryl resin was altered by controlling the amount of the functional group present on the surface of the polyurethane resin or styrene-acryl resin, and molecular weight of the polyurethane resin or styrene-acryl resin was altered by selecting the polymerization method of monomers.

TABLE 1

| Ink | D50 (nm) | D90 (B-A) (nm) | D90 (C-B) (nm) | Resin | Resin content | Dispersant | Dispersant ratio | DBP oil absorption (g/100 g) |
|---|---|---|---|---|---|---|---|---|
| 1 | 125 | 25 | 5 | a | 2.0 | (1) | 0.25 | 400 |
| 2 | 125 | 50 | 5 | b | 2.0 | (1) | 0.25 | 400 |
| 3 | 125 | 35 | 10 | c | 2.0 | (1) | 0.25 | 400 |
| 4 | 135 | 25 | 5 | n | 2.0 | (1) | 0.25 | 400 |
| 5 | 135 | 45 | 5 | o | 2.0 | (1) | 0.25 | 400 |
| 6 | 115 | 35 | 10 | p | 2.0 | (1) | 0.25 | 400 |
| 7 | 115 | 25 | 5 | a | 12.0 | (1) | 0.25 | 400 |
| 8 | 125 | 25 | 5 | n | 12.0 | (1) | 0.25 | 400 |
| 9 | 125 | 20 | 5 | a | 0.05 | (1) | 0.25 | 400 |
| 10 | 125 | 20 | 5 | n | 0.05 | (1) | 0.25 | 400 |
| 11 | 125 | 25 | 5 | g | 2.0 | (1) | 0.25 | 400 |
| 12 | 125 | 25 | 5 | h | 2.0 | (1) | 0.25 | 400 |
| 13 | 125 | 25 | 5 | i | 2.0 | (1) | 0.25 | 400 |
| 14 | 125 | 25 | 5 | j | 2.0 | (1) | 0.25 | 400 |
| 15 | 125 | 25 | 5 | k | 2.0 | (1) | 0.25 | 400 |
| 16 | 125 | 25 | 5 | q | 2.0 | (1) | 0.25 | 400 |
| 17 | 125 | 25 | 5 | r | 2.0 | (1) | 0.25 | 400 |
| 18 | 125 | 25 | 5 | s | 2.0 | (1) | 0.25 | 400 |
| 19 | 125 | 25 | 5 | t | 2.0 | (1) | 0.25 | 400 |
| 20 | 125 | 25 | 5 | a | 2.0 | (2) | 0.25 | 400 |
| 21 | 125 | 25 | 5 | a | 2.0 | (3) | 1.50 | 400 |
| 22 | 125 | 25 | 5 | a | 2.0 | (1) | 2.50 | 400 |
| 23 | 125 | 25 | 5 | a | 2.0 | (4) | 1.50 | 400 |
| 24 | 125 | 25 | 5 | a | 2.0 | (1) | 0.25 | 250 |
| 25 | 125 | 25 | 5 | a | 2.0 | (1) | 0.25 | 850 |
| 26 | 75 | 35 | 10 | n | 2.0 | (1) | 0.25 | 400 |
| 27 | 225 | 35 | 10 | n | 2.0 | (1) | 0.25 | 400 |
| 1' | 125 | 10 | 5 | l | 2.0 | (1) | 0.25 | 400 |
| 2' | 125 | 55 | 5 | m | 2.0 | (1) | 0.25 | 400 |

Note that, in Table 1, the numbers 1-27 and 1'-2' presented in the columns titled as Ink represent Ink Nos. 1-27 and 1'-2', respectively, and D50 represents a particle diameter D50.

The specific compound and physical property of each of the dispersants (1) to (4), and urethane resin or styrene-acryl resin a to t of Table 1 were respectively presented in Tables 2 to 4 below.

TABLE 2

| Dispersant No. | Dispersant | Total amount of di-, tri- and tetramers (%) |
|---|---|---|
| (1) | Sodium naphthalenesulfonate-formalin condensate | 50 |
| (2) | Sodium naphthalenesulfonate-formalin condensate | 15 |
| (3) | Sodium naphthalenesulfonate-formalin condensate | 85 |
| (4) | Water-soluble styrene-acryl resin | — |

TABLE 3

| Urethane resin | Ionic structure | Tg (° C.) | D50 (nm) | Acid value | Mw |
|---|---|---|---|---|---|
| a | Anionic self-emulsifying ether | 55 | 5 | 55 | 15,000 |
| b | Anionic self-emulsifying ether | 100 | 10 | 55 | 15,000 |
| c | Anionic self-emulsifying ether | 145 | 15 | 55 | 15,000 |
| g | Anionic self-emulsifying ether | 100 | 10 | 45 | 15,000 |
| h | Anionic self-emulsifying ether | 100 | 10 | 105 | 15,000 |
| i | Anionic self-emulsifying ether | 100 | 10 | 105 | 7,500 |
| j | Anionic self-emulsifying ether | 100 | 10 | 105 | 35,000 |
| k | Anionic self-emulsifying carbonate | 100 | 10 | 55 | 15,000 |
| l | Anionic self-emulsifying ether | 100 | 5 | 90 | 15,000 |
| m | Anionic self-emulsifying ether | 100 | 10 | 80 | 15,000 |

Note that, in Table 3, Tg represents a glass transition temperature, D50 represents a particle diameter D50, and Mw represents a weight average molecular weight.

TABLE 4

| Styrene-acryl resin | Tg (° C.) | D50 (nm) | Acid value | Mw |
|---|---|---|---|---|
| n | 75 | 5 | 180 | 17,500 |
| o | 100 | 10 | 180 | 17,500 |
| p | 130 | 15 | 180 | 17,500 |
| q | 130 | 10 | 75 | 15,000 |
| r | 130 | 10 | 225 | 15,000 |
| s | 100 | 5 | 180 | 7,500 |
| t | 100 | 5 | 180 | 35,000 |

Note that, in Table 4, Tg represents a glass transition temperature, D50 represents a particle diameter D50, and Mw represents a weight average molecular weight.

A carbon black ink was prepared by using the aforementioned carbon black dispersant according to the ink formula below, and after dispersing for 30 minutes, filtered with a membrane filter having a pore diameter of 0.8 μm, followed by vacuum deairing, to thereby obtain carbon black ink of Example (No. 1). The carbon black inks of Examples (Nos. 2-28), and Comparative Examples (Nos. 1-2) were obtained in the same manner.

<Ink Formula>

| | |
|---|---|
| Carbon black dispersion (carbon black density: 25%, total solid content: 8%) | 39.0 parts |
| Glycerin | 7.5 parts |
| Diethylene glycol | 15.0 parts |
| 2-ethyl-1,3-hexanediol | 3.0 parts |
| 2-pyrrolidone | 3.0 parts |
| Sodium polyethylene(3)alkyl(C13) ether acetate | 0.5 parts |
| Resin emulsion | According to the ratio of each Example or Comparative Example |
| Distilled water | Balance |

Subsequentially, the thus obtained carbon black ink was filled in an ink pack for an inkjet printer (IPSiO GX 3000, manufactured by Ricoh Company Limited) so as to prepare an ink cartridge.

Next, a preparation example of a nozzle plate for use will be explained.

PREPARATION EXAMPLE 1

-Preparation of Nozzle Plate 1-

On a surface of Ni electroformed nozzle, a silicone resin (SR2411, manufactured by Dow Corning Toray Co., Ltd.) was applied by a dispenser so as to form a silicone layer. At the time of the application of the silicone resin, nozzle openings and back surface of the nozzle plate were masked with a water-soluble resin, and the mask was peeled and removed after the formation of the silicone layer. The silicone layer was then left to stand at a room temperature for 2 days so as to cure the silicone resin, to thereby obtain an ink-repellent layer having a thickness of 1.2 μm. The thus obtained ink-repellent layer had a surface roughness (Ra) of 0.18 μm, and critical surface tension of 21.6 mN/m. Here, a thickness of the ink -repellent layer was measured by a spectrometric film thickness measurement system (LAMBDA ACE VM-8000J, manufactured by Dainippon Screen Mfg. Co., Ltd.). Moreover, the surface roughness of the ink-repellent layer was measured by a stylus surface profiler (Dektak 3-ST, manufactured by Veeco Instruments Inc.). The critical surface tension of the ink-repellent layer was measured in accordance with a method proposed by Zisman.

PREPARATION EXAMPLE 2

-Preparation of Nozzle Plate 2-

An ink-repellent layer having a thickness of 1.0 μm was formed in the same manner as in Preparation Example 1, provided that the silicone resin used in Preparation Example 1 was replaced with a silicone resin (KBM 7803, manufactured by Shin-Etsu Chemical Co., Ltd.). The surface roughness (Ra) and critical surface tension of the thus obtained ink-repellent layer were measured in the same manner as in Preparation Example 1, and were 0.2 μm and 16.9 mN/m, respectively.

PREPARATION EXAMPLE 3

-Preparation of Nozzle Plate 3-

A nozzle plate 3 was formed in the same manner as in Preparation Example 1, provided that an ink-repellent layer was formed on the Ni electroformed nozzle surface by PTFE-Ni eutectoid plating, instead of the ink-repellent layer formed of the silicone resin of Preparation Example 1. The surface roughness (Ra) and critical surface tension of the thus obtained ink-repellent layer were measured in the same manner as in Preparation Example 1, and were 0.25 μm and 25.0mN/m, respectively.

PREPARATION EXAMPLE 4

-Preparation of Nozzle Plate 4-

A nozzle plate 4 was formed in the same manner as in Preparation Example 1, provided that an ink-repellent layer was formed on the Ni electroformed nozzle surface by treating with a fluororesin, instead of the ink-repellent layer formed of the silicone resin of Preparation Example 1. The surface roughness (Ra) and critical surface tension were measured in the same manner as in Preparation Example 1, and were 0.30 μm and 22.0 mN/m, respectively.

PREPARATION COMPARATIVE EXAMPLE 1

Preparation of Nozzle Plate 5

A nozzle plate 5 was formed in the same manner as in Preparation Example 1, provided that the ink-repellent layer formed of the silicone resin was not formed on the Ni electroformed nozzle surface.

The thus obtained nozzle plates 1 to 5 were each disposed in an inkjet printer (IPSiO GX 3000, manufactured by Ricoh Company Limited), and each inkjet printer printed on PPC paper (XEROX 4024, manufactured by Fuji Xerox Co., Ltd.). The ejection stability, image density and shelf-stability of the ink were evaluated by the following manner.

The results of the evaluations were shown in Table 5.

[Evaluation 1: Ejection Stability]

The printer was placed in a thermohygrostat which was set at the temperature of 32° C. and humidity of 30% RH, and continuously printed the print pattern chart described below on 20 pieces of the paper, and then rested for 20 minutes without printing. This procedure was repeated for 50 times, and after printing on 1,000 pieces of the paper in total, the nozzle plate was observed under a microscope to confirm whether or not any ink solid was attached to the nozzle plate.

-Print Pattern Chart-

The used print pattern was a chart in which each color occupied 5% of the total area of the paper, and the printing was performed using each ink at 100% duty based on the print pattern. As the conditions for printing, the recording density was set at 300 dpi, and the system for use was a one-pass printing system. The evaluation criteria were as follows.

A: no attachment of the ink was present adjacent to a nozzle
B: some attachments were present adjacent to a nozzle, but could be removed by a wiper
C: some attachments were present adjacent to a nozzle and completely fixed there

[Evaluation 2: Evaluation of Image]

The image density of the solid image portion in the image sample was measured by means of X-Rite densitometer. The evaluation criteria were as follows.

A: 1.30 or more
B: 1.20 or more but less than 1.30
C: less than 1.20

[Evaluation 3: Shelf-stability of Ink]

Each ink was placed in a polyethylene container, and the container was sealed. In this condition, the ink was stored at 70° C. for 3 weeks. After the storage, a particle diameter, surface tension and viscosity of the ink were measured, and compared to the initial physical properties of the ink. The rates of the changes (%) were evaluated with reference to the following evaluation criteria.

A: 10% or less
B: 30% or less
C: more than 30%

TABLE 5

| | Ink | Nozzle plate | Ejection stability (attachment of ink) | Image evaluation | Shelf-stability of ink |
|---|---|---|---|---|---|
| Ex. 1 | 1 | 1 | A | A | A |
| Ex. 2 | 2 | 1 | A | A | A |
| Ex. 3 | 3 | 2 | A | A | A |
| Ex. 4 | 4 | 2 | A | A | A |
| Ex. 5 | 5 | 3 | A | A | A |
| Ex. 6 | 6 | 3 | A | A | A |
| Ex. 7 | 7 | 4 | B | A | A |
| Ex. 8 | 8 | 4 | B | A | A |
| Ex. 9 | 9 | 1 | A | A | A |
| Ex. 10 | 10 | 1 | A | A | B |
| Ex. 11 | 11 | 2 | A | A | B |
| Ex. 12 | 12 | 2 | A | A | B |
| Ex. 13 | 13 | 3 | A | A | B |
| Ex. 14 | 14 | 3 | B | A | A |
| Ex. 15 | 15 | 4 | B | A | B |
| Ex. 16 | 16 | 4 | A | A | B |
| Ex. 17 | 17 | 1 | A | A | B |
| Ex. 18 | 18 | 1 | A | A | B |
| Ex. 19 | 19 | 2 | B | A | A |
| Ex. 20 | 20 | 2 | A | A | B |
| Ex. 21 | 21 | 3 | A | A | B |
| Ex. 22 | 22 | 3 | A | A | B |
| Ex. 23 | 23 | 4 | A | A | B |
| Ex. 24 | 24 | 4 | A | B | A |
| Ex. 25 | 25 | 1 | A | A | A |
| Ex. 26 | 26 | 1 | A | B | A |
| Ex. 27 | 27 | 2 | B | A | A |
| Ex. 28 | 3 | 5 | C | B | A |
| Comp. 1 | 1' | 1 | C | B | C |
| Comp. 2 | 2' | 2 | B | B | C |

Note that, in Table 5, the numbers 1-27 and 1'-2' presented in the columns titled as Ink represent Ink Nos. 1-27 and 1'-2, respectively.

Industrial Applicability

The inkjet recording ink of the present invention can realize both shelf-stability and image quality, and prevents to solidify and attach to an inkjet head having an ink-repellent layer formed by PTFE-Ni eutectoid plating, or a treatment with a fluororesin or a silicone resin. The ink cartridge and image forming method using the inkjet recording ink of the present invention can form high quality images, and as a result, an image recorded matter of high quality image can be obtained.

The invention claimed is:

1. An inkjet recording ink comprising:
a carbon black;
a dispersant, wherein the dispersant is a sodium naphthalenesulfonate-formalin condensate in which a total amount of a dimer, trimer and tetramer of naphthalenesulfonate is 20% by mass to 80% by mass with respect to the total amount of the condensate;
resin emulsion; and
water,
wherein the resin emulsion comprises a resin which is at least one of a urethane resin and a styrene-acryl resin, and
wherein the ink satisfies the following relationship:

$$20 \leq B-A \leq 50,$$

where A(nm) represents a particle diameter D90 of particles in dispersion comprising the carbon black, the dispersant, and water, which is before added with the resin emulsion, and B(nm) represents a particle diameter D90 of particles in the ink.

2. The ink according to claim 1, wherein an amount of the resin emulsion in the ink is 0.1% by mass to 10% by mass on the basis of resin solids, with respect to 100% by mass of the ink.

3. The ink according to claim 1, wherein the urethane resin is an anionic self-emulsifying etherified polyurethane resin which has an acid value of 50 to 100, and a weight average molecular weight of 10,000 to 30,000.

4. The ink according to claim 1, wherein the styrene-acryl resin has an acid value of 100 to 200, and a weight average molecular weight of 10,000 to 30,000.

5. The ink according to claim 1, wherein an amount of the dispersant in the ink is defined by a mass ratio with the carbon black, and the mass ratio of the dispersant to the carbon black is 0.01/1 to 2/1.

6. The ink according to claim 1, wherein the carbon black has a DBP oil adsorption of 300 g/100 g to 750 g/100 g.

7. The ink according to claim 1, wherein the particles contained in the ink have an average particle diameter D50 of 100 nm to 200 nm.

8. An ink cartridge, comprising:
a housing; and
an inkjet recording ink housed in the housing,
wherein the inkjet recording ink comprises:
a carbon black;
a dispersant, wherein the dispersant is a sodium naphthalenesulfonate-formalin condensate in which a total amount of a dimer, trimer and tetramer of naphthalenesulfonate is 20% by mass to 80% by mass with respect to the total amount of the condensate;
resin emulsion; and
water,
wherein the resin emulsion comprises a resin which is at least one of a urethane resin and a styrene-acryl resin, and
wherein the ink satisfies the following relationship:

$$20B-A \leq 50,$$

where A(nm) represents a particle diameter D90 of particles in dispersion comprising the carbon black, the dispersant, and water, which is before added with the resin emulsion, and B(nm) represents a particle diameter D90 of particles in the ink.

9. An image forming method, comprising:
printing using an inkjet recording ink by means of an inkjet recording apparatus,
wherein the inkjet recording apparatus is equipped with an inkjet head comprising an ink-repellent layer formed by PTFE-Ni eutectoid plating, or a treatment with a fluororesin or a silicone resin,
wherein the inkjet recording ink comprises:
a carbon black;
a dispersant, wherein the dispersant is a sodium naphthalenesulfonate-formalin condensate in which a total amount of a dimer, trimer and tetramer of naphthalenesulfonate is 20% by mass to 80% by mass with respect to the total amount of the condensate;
resin emulsion; and
water,
wherein the resin emulsion comprises a resin which is at least one of a urethane resin and a styrene-acryl resin, and
wherein the ink satisfies the following relationship:

$$20B-A \leq 50,$$

where A(nm) represents a particle diameter D90 of particles in dispersion comprising the carbon black, the dispersant, and water, which is before added with the resin emulsion, and B(nm) represents a particle diameter D90 of particles in the ink.

* * * * *